UNITED STATES PATENT OFFICE.

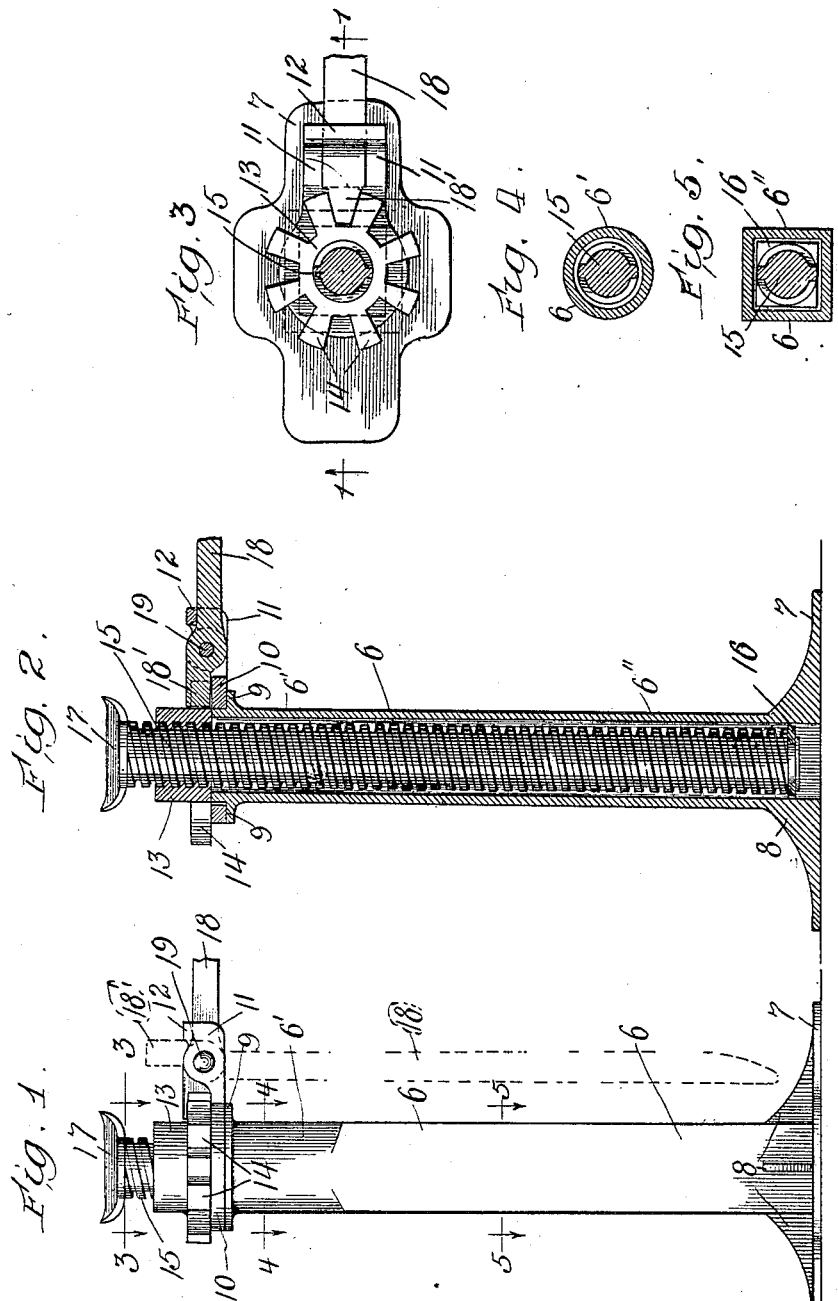

ANDREW J. OLIVER, OF CHICAGO, ILLINOIS.

SCREW-JACK.

No. 825,752.  Specification of Letters Patent.  Patented July 10, 1906.

Application filed July 10, 1905. Serial No. 268,957.

*To all whom it may concern:*

Be it known that I, ANDREW J. OLIVER, a citizen of the United States, residing at Chicago, in the county of Cook and State of Illinois, have invented certain new and useful Improvements in Screw-Jacks, of which the following is a specification.

My invention relates to improvements in screw-jacks, and has for its object to provide a jack which will be simple in construction, cheap and easy of manufacture, efficient in operation, and which may be operated in small or cramped places.

In the drawings, wherein I have illustrated an operative embodiment of my invention, Figure 1 is a side elevation thereof. Fig. 2 is a transverse vertical section. Fig. 3 is a section on line 3 3 of Fig. 1. Fig. 4 is a section on line 4 4 of Fig. 1, and Fig. 5 is a section on line 5 5 of Fig. 1.

Throughout the drawings like numerals of reference refer always to like parts.

Referring now to the drawings, 6 indicates the frame or shell, preferably of circular cross-section at its upper portion 6' and square in cross-section at its lower end 6'', said shell being provided at its bottom with a suitable base or foot 7, preferably made integral with the shell and connected therewith also by integral ribs 8, which serve to strengthen the structure.

The shell 6 is preferably hollow throughout and is provided adjacent its top with an external flange 9, which serves as a supporting-bearing for a collar 10, rotatably mounted thereon. The collar 10 is provided with projecting arms 11 11, which serve as pivotal supports for the operating-lever to be described, said projections or arms 11 being preferably connected across the top by a bar 12, which serves as a stop to limit the movement of the operating-handle.

13 indicates an internally-screw-threaded nut arranged to bear upon the top of the shell 6 at substantially the level of the top of the collar 10, said nut being externally provided with teeth 14, between which intervene the complementary notches 14'. The nut 13 is maintained against lateral displacement by its screw 15, which passes therethrough into the interior of the shell 6. Said screw is at its lower end provided with a square collar 16, rigidly secured thereto and engaging the square portion 6'' of the shell to prevent rotation of the screw. The screw 15 is preferably square-threaded and provided with a double thread, so that the complementary threads of the nut 13 make intimate and firm engagement therewith. At its upper end the screw 15 is provided with the usual head 17 to engage the article to be elevated.

18 indicates the operating-lever pivoted, as at 19, between the arms or projections 11 of the collar 10, said lever providing at its outer end a handle and at its inner end a tongue 18' of suitable shape to interfit in the notches 14' of the toothed nut 13. The arrangement of parts is preferably such that when the lever 18 hangs in pendent position, as shown in dotted lines in Fig. 1, the tongue 18' is lifted out of the notches of the nut 13; but when the lever 18 is raised until it strikes its limitation-stop 12, as shown in full lines in Figs. 1 and 2, the tongue 18' makes engagement with a notch 14' of the toothed nut.

The operation of my improved device will be as follows: Assuming that it is desired to elevate the head of the jack, the operating-lever is raised from the position shown in dotted lines in Fig. 1 to the position shown in full lines, when it engages in a notch of the nut 13, and then the lever is rotated to the left, the ring 10 turning upon its flange 9 and the tongue 18' serving as a connector between the ring 10 and the nut 13 to cause the rotation of the nut with the ring. It will therefore be readily understood that as the screw 15 is prevented from rotation by the engagement of its square collar 16 with the squared interior of the shell said screw 15 is axially raised. After a suitable movement of the handle in the desired direction, whether it be through an arc corresponding with only the width of one of the teeth of the nut or a larger arc, the handle end of the lever 18 may be depressed to elevate the tongue 18' out of engagement with the teeth of the nut, the collar 10 turned so that the lever is carried bodily back without moving the nut 13, and the handle end of the lever again lifted to cause the connection of the ring 10 and the nut 13 through the instrumentality of the tongue 18' in order that further movement in the deisred direction may be imparted to the nut. It will therefore be apparent that the construction is such that but little room is required for the manipulation of the jack and that where there is an abundance of room for its use the handle may be swung to such position as will afford the most convenient and effective leverage.

Having thus described my invention, what

I claim as new, and desire to secure by Letters Patent of the United States, is—

1. In a jack, a shell, a non-rotatable, axially-movable screw projecting from the upper end of said shell, a nut on said screw above said shell, a collar rotatable on the shell independently of the nut, and an operating-lever pivoted in the collar, said lever providing a handle part and a tongue part, and being so disposed that movement of the handle part may cause the tongue part to engage with or disengage from the toothed nut.

2. In a jack, the combination of a shell, a base therefor, a non-rotatable, axially-adjustable screw projecting from the top of said shell, and provided with a double thread, a nut 13 upon said screw above the shell, a ring 10 below said nut, rotatable upon the shell, a lever 18 pivoted in said ring and provided with a tongue 18′ for engagement with the teeth of a toothed nut.

3. In a jack, the combination of a support, an axially-movable, non-rotatable screw projecting above said support and provided with a head, a nut engaging said screw, a handle pivoted in the plane of the nut provided with a projection axially extending toward said nut when in engagement therewith, and arranged to engage the nut when the handle is moved for connecting said handle and nut together for rotation in either direction.

4. In a jack, the non-rotatable screw 15, a flange 9 near its upper end, a collar 10 resting thereon, carrying-arms 11, and connecting-bar 12 joining the projecting arms 11, a handle 18 pivoted to the arms 11 under the connecting-bar 12, a nut 13, and a tongue 18′ arranged to engage the nut for rotation therewith when the handle is raised.

5. In a jack, a support, a non-rotating screw extending above the support, a toothed nut arranged to be rotated around the screw, a rotatable collar loosely supported below the nut and carrying handle-supporting projections, a handle pivoted thereto and arranged to be raised to engage the nut, and a tongue extending axially from said handle to engage said nut when the handle is raised.

In testimony whereof I hereunto set my hand in the presence of two witnesses.

ANDREW J. OLIVER.

In presence of—
GEORGE T. MAY, Jr.,
MARY F. ALLEN.